United States Patent [19]

Pohle et al.

[11] Patent Number: 4,950,063
[45] Date of Patent: Aug. 21, 1990

[54] AUTOMATIC COMPENSATION OF OPTICAL PATH FOR GIMBALED PHASED ARRAY TELESCOPE

[75] Inventors: Richard H. Pohle, Kula, Hi.; David M. Stubbs, Mtn. View, Calif.

[73] Assignee: The United States of America as represented by the Secretary of the Air Force, Washington, D.C.

[21] Appl. No.: 317,161

[22] Filed: Feb. 28, 1989

[51] Int. Cl.$^5$ .......................... G02B 7/00; G02B 23/00
[52] U.S. Cl. .................................. 350/571; 350/568; 356/141; 250/201.1
[58] Field of Search ................. 350/172, 173, 571–573; 343/754, 777, 872, 878; 248/182, 188.3; 356/141; 244/63, 158 R, 172; 342/80, 100, 110, 161, 372

[56] References Cited

U.S. PATENT DOCUMENTS

| | | | |
|---|---|---|---|
| 3,359,851 | 12/1967 | Lipschutz et al. | 350/172 |
| 3,419,898 | 12/1968 | Baldwin et al. | 350/173 |
| 3,866,229 | 2/1975 | Hammack | 356/141 |
| 3,898,639 | 8/1975 | Nuncheryan | 350/172 |
| 3,961,334 | 6/1976 | Whitby et al. | 350/173 |
| 4,034,373 | 7/1977 | Depierre et al. | 342/161 |
| 4,070,678 | 1/1978 | Smedes | 343/756 |
| 4,087,162 | 5/1978 | Kuffer | 350/622 |
| 4,165,936 | 8/1979 | Eisenring et al. | 350/1.2 |
| 4,404,465 | 9/1983 | Miller | 250/239 |
| 4,417,253 | 11/1983 | Jacks | 350/173 |
| 4,639,586 | 1/1987 | Fender et al. | 356/354 |
| 4,795,113 | 1/1989 | Minovitch | 244/158 R |

OTHER PUBLICATIONS

"Radar Scanners and Radone's" W. M Cody et al., McGraw-Hill Book Company, 1948.
"Introduction to Radar Systems" Merrill I. Skolnik McGraw-Hill Book Company, 1962, pp. 307–312.

Primary Examiner—Rodney B. Bovernick
Assistant Examiner—Thong Nguyen
Attorney, Agent, or Firm—William G. Auton; Donald J. Singer

[57] ABSTRACT

An optical phased array system is disclosed that uses three methods of phased array retargeting: optical retargeting, element slew, and rigid body array slew. These work together in hierarchical fashion to reduce the retargeting disturbances and enhance system performance by shortening retargeting timelines. The optical train configuration given here is an embodiment for the approach to use the rotation of each array element (e.g. telescopes) in the phased array to provide most of the large optical path length shift required for phasing during a phased array look angle shift by individual telescope slew (i.e. venetian blind steering). The optical train configuration discussed here provides about 97% of the optical path length compensation required for a slew to ±20 degrees from the array normal. This greatly reduces the amplitude required of the piston control mirror if an equal optical path length is to be maintained from object to sensor. The design geometry is specific to a seven element, one ring array although the concept is applicable to other array configurations.

2 Claims, 18 Drawing Sheets

20° SLEW
0° AZIMUTH

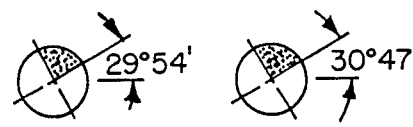
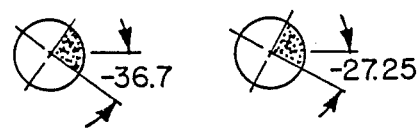
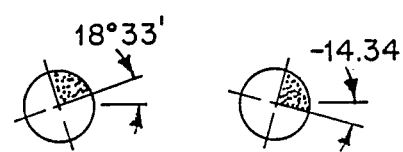
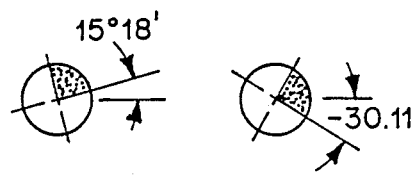

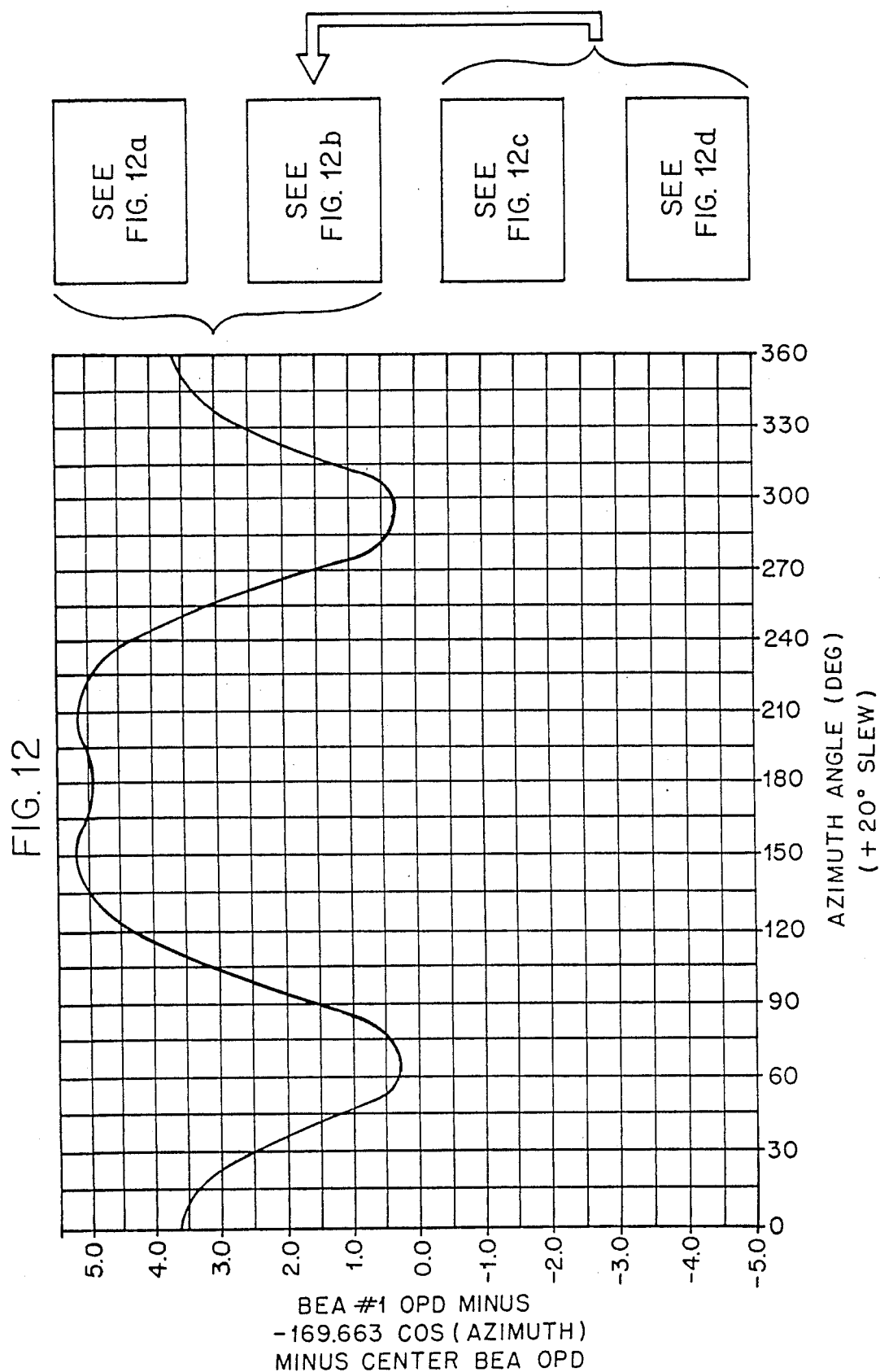

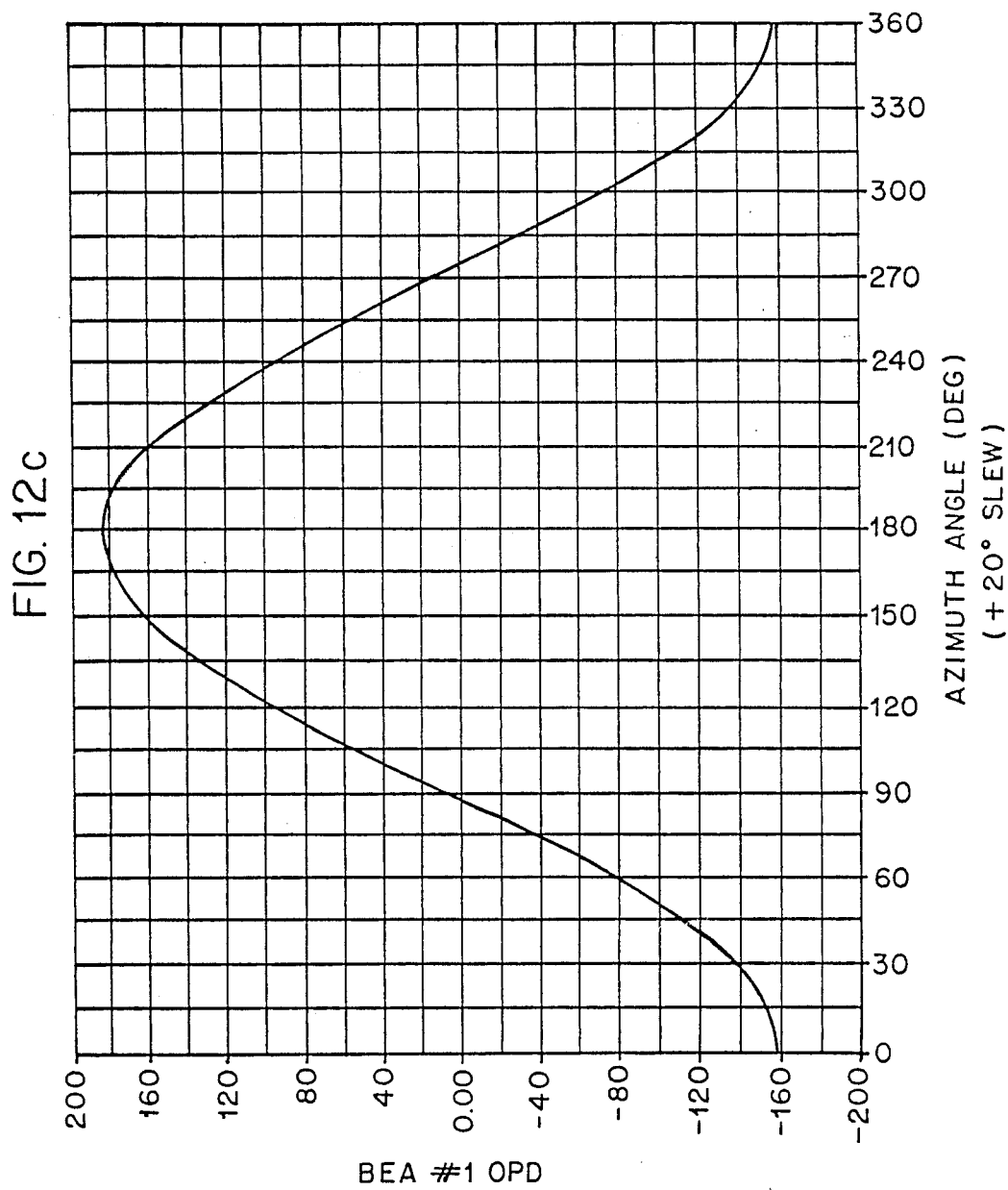

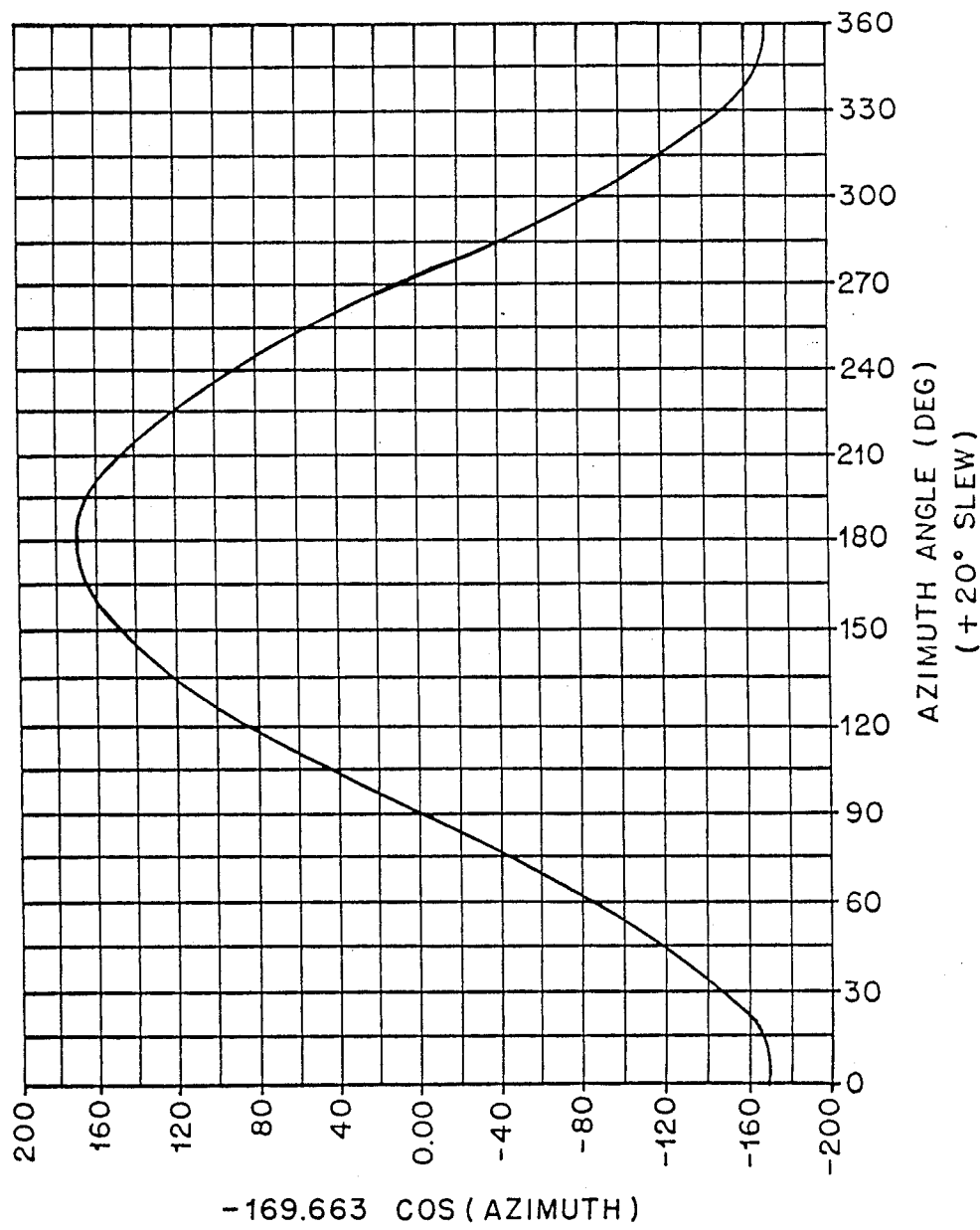

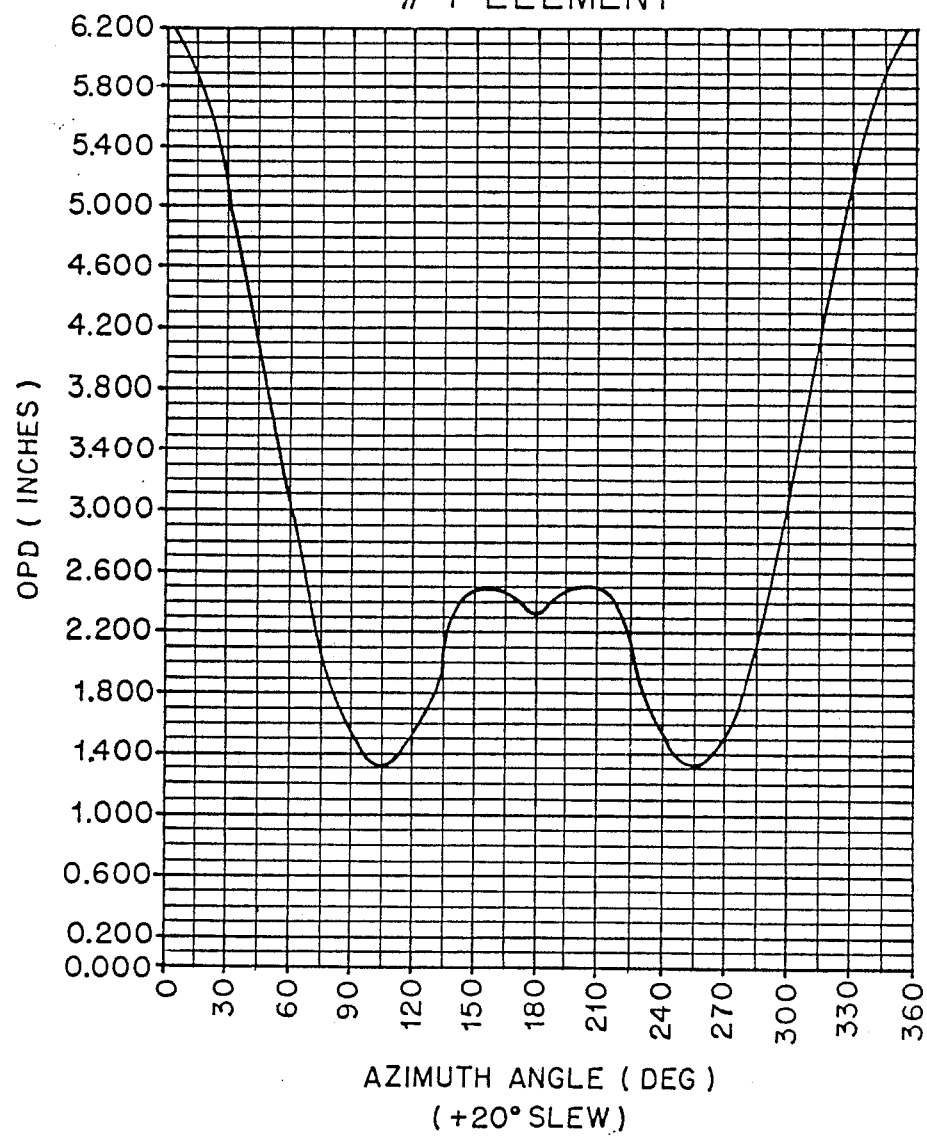

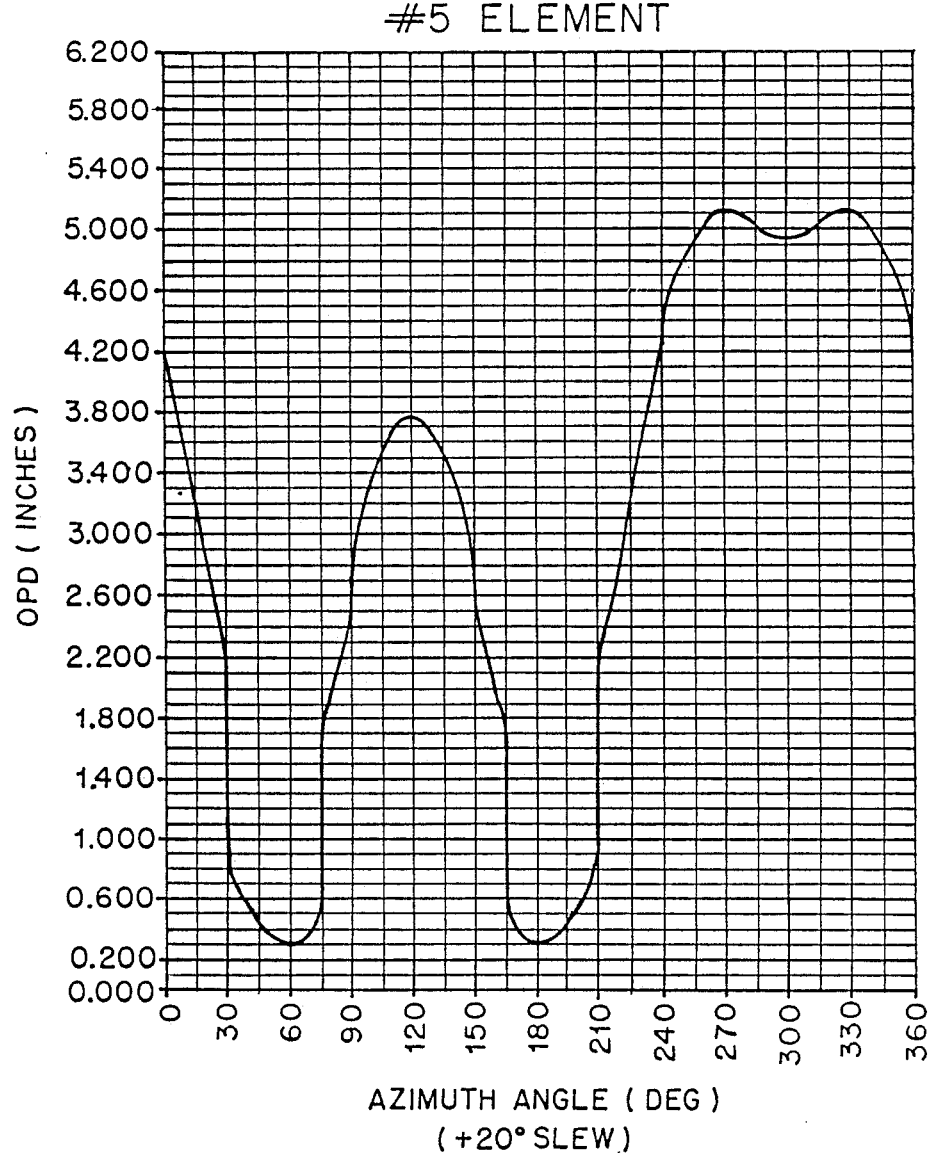

AUTOMATIC COMPENSATION OF OPTICAL PATH FOR GIMBALED PHASED ARRAY TELESCOPE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to laser beam projectors and telescopes, and more specifically to a gimbaled phased array projector/telescope.

A synthetic aperture is formed when separate optical systems are combined to function as a single larger aperture. When a telescope aperture is synthesized, independent optical systems are phased or adjusted to provide a common optical path length from the object to the focal plane. This results in a system in which all the independent optical elements form a common image field with resolution determined by the maximum dimension of the array and therefore exceeding that produced by any single element. Likewise, by optically phasing an array of multiple laser beam projectors, a synthetic aperture is formed which can achieve the performance of an equivalent sized, single laser transmitter.

While the use of multiple laser projectors in a synthetic array has a number of advantages, this use also poses a problem in that the multiple laser projectors (each being an element in the array) must be brought into phase with each other. This task becomes complicated when the array is in the process of tracking one or more moving targets.

The term "Self Compensating Phase Control" is a name for the approach to use the rotation of each array element (e.g., projectors or telescopes) in the phased array to provide most of the large optical path length shift required for phasing during a phased array look angle shift by individual telescope slew (i.e. venetian blind steering). The optical train configurations of conventional systems requires a relatively large amplitude of adjustment in the piston control mirror if an equal optical path length is to be maintained from object to sensor for a telescope or laser to target for a laser projector across all of the elements in the array.

The task of adjusting the phase and optical path lengths of multiple laser projectors which form an array which tracks moving targets is alleviated, to some extent, by the systems disclosed in the following U.S. Patents, the disclosures of which are specifically incorporated by reference.

| | |
|---|---|
| U.S. Pat. No. | 4,639,586 issued to J. Fender et al; |
| U.S. Pat. No. | 3,898,639 issued to H. Nuncheryan; |
| U.S. Pat. No. | 3,359,581 issued to L. Lipschutz et al.; |
| U.S. Pat. No. | 4,417,253 issued to H. Jacky; |
| U.S. Pat. No. | 3,961,334 issued to C. Whitby et al; |
| U.S. Pat. No. | 4,087,162 issued to F. Kuffer; |
| U.S. Pat. No. | 3,419,898 Baldwin et al.; and |
| U.S. Pat. No. | 4,165,936 Eisenring et al. |

The subject matter of this application is related to the subject matter contained in the U.S. Pat. No. 4,639,586 issued Jan. 27, 1987, entitled "Optically Phased Laser Transmitter" by Janet Fender et al.

U.S. Pat. No. 3,898,639 discloses a security surveillance laser system having a plurality of laser beams steered by mirrors in parallel paths. U.S. Pat. No. 3,359,851 discloses a multiple beam interferometer which includes a plurality of filters and mirrors for directing a particular component of a reflected light beam to an associated camera. U.S. Pat. Nos. 4,417,253; 3,961,334; 4,087,162; 3,419,898 and 4,165,936 each discloses beams of light being steered by a plurality of mirrors.

The present application hereby incorporates by the patent of Janet S. Fender et al., entitled "Optically Phased Laser Transmitter", U.S. Pat. No. 4,639,586. The apparatus of the Fender et al. patent is a laser transmitter which optically phases the output of an array of multiple optical laser telescopes to achieve the performance of a single laser transmitter of equivalent size.

The Fender et al. apparatus performs wavefront phase matching between pairs of laser beams using an array containing at least two optical telescopes which become useable as a laser beam transmitter when combined with an optical wavefront phase matching system consisting of a collecting telescope, a detector array, two fold mirrors, analog-to digital converter, microprocessor, and two sets of correcting mirrors.

The two optical telescopes are adjacent to each other, and transmit two separate outgoing laser beams which require phase matching. The original source of the two outgoing beams may be either: a single laser beam, which has been divided (monochromatic); or two separately generated but coherent laser beams.

The collecting telescope sits in front of the two optic telescopes and bridges the gap between them. In this way, the collecting telescope is able to intercept samples of outgoing laser beams from the edges of both telescopes and focus them through the two fold mirrors to the detector array.

The detector array may be either a line scan or an area charge coupled device (CCD), which reads out the fringe pattern by generating an interference pattern. The microcomputer controlled image processor receives the interference pattern between samples of pairs of transmitted laser beams from the CCD camera, then performs a calculation of the difference in phase of the wavefronts between the two teams. This allows the laser transmitter to match the phase of the outgoing beams by adjusting the optical path lengths using the correcting mirrors which trombone to increase or decrease the optical path length as required.

While the system disclosed in the above-cited references are instructive, a need remains to provide a mirror configuration for self-compensation of a laser beam phase mismatch in an array which occurs while retargeting the beam. The present invention is intended to satisfy that need. The present invention also provides a system which greatly reduces the amplitude of adjustment required in the piston control mirror while maintaining an equal optical path length from the object to the sensor for a uniform laser beam phase across all of the elements in the array.

SUMMARY OF THE INVENTION

The present invention includes a mirror configuration for automatic compensation of optical path length during retargeting of the optical phased array of laser projectors. One embodiment of the gimbaled optical array includes seven laser telescopes which each serves as an element of the array. Each element is mounted on gimbals which allows each element to be individually tilted. This type of beam steering is called venetian blind steering. Additionally, the entire array is gimbaled to allow the entire array to be tilted as required. The reason for this design is discussed briefly below.

When the present invention functions as a laser tracking system, it may be required to retarget at both large angles (greater than 20 degrees) and moderate angles (2-20 degrees). Large angle retargeting may be required when retargeting from one target swarm (perhaps a set of launch vehicles) to a distant target swarm associated with a different set of launch vehicles. Moderate angle retargeting may be required for adjacent target swarms. Small angle retargeting (0–2 degrees) may be required for adjacent targets.

There are three methods for changing the look angle of a phased array: (1) beamsteering elements (mirrors) in each telescope can produce relatively small angle (e.g. ~2 degrees) look angle shifts (LAS) by optical retargeting; (2) individual telescope slew can produce moderate angle e.g. ~20 degrees) LAS by a technique called venetian blind steering; and, (3) rigid body slew of the entire array system can produce large angle LAS. The present invention makes use of all three methods, including venetian blind steering; a capability unique to the phased array. As disclosed by Fender et al., this produces corresponding changes in phase to the outputs of each element. In aggregate, this has the effect of steering the optical array output in the manner that phased array radar elements steer the outputs of radar tracking systems.

Phased array retargeting by element slew about the element center of mass changes the optical path length through each element from the object to the image plane. The invention makes use of gimbal rotation to provide a gross optical path compensation, thereby allowing parallel beams of laser light to remain in approximate phase even if the angle at which each beam is retargeted is a ±20 degree rotation from the array axis normal to the plane of the array elements. The invention includes a plurality of two stage phase adjustment mirrors with high band width capability configured to exactly correct the residual phase error such that the optical path length remains constant, even if the laser beam direction is rotated ±20 degrees from the array axis.

It is an object of the present invention to provide a phased array of laser telescopes capable of adjusting the optical path lengths of the individual elements while tracking a target.

It is another object of the present invention to provide a phased array of laser telescopes capable of large angle retargeting and moderate angle retargeting by a combination of tilting the entire array, and tilting the individual elements in the array.

These objects together with other objects, features and advantages of the invention will become more readily apparent from the following detailed description when taken in conjunction with the accompanying drawing wherein like elements are given like reference numerals throughout.

DESCRIPTION OF THE DRAWINGS

FIGS. 9-11 and 9a depict the pupil rotation of the elements of FIG. 7 during venetian blind steering;

DETAILED DESCRIPTION OF THE PREFERRED EMBODIMENT

The present invention is a phased array of laser telescopes which allows retargeting by: element slew on an element gimbal, as well as a tilt of array slew by gimbal rotation, and final adjustments of the phase of each element by precise, high bandwidth changes in the intervening optical path length to its output.

Figure 1:
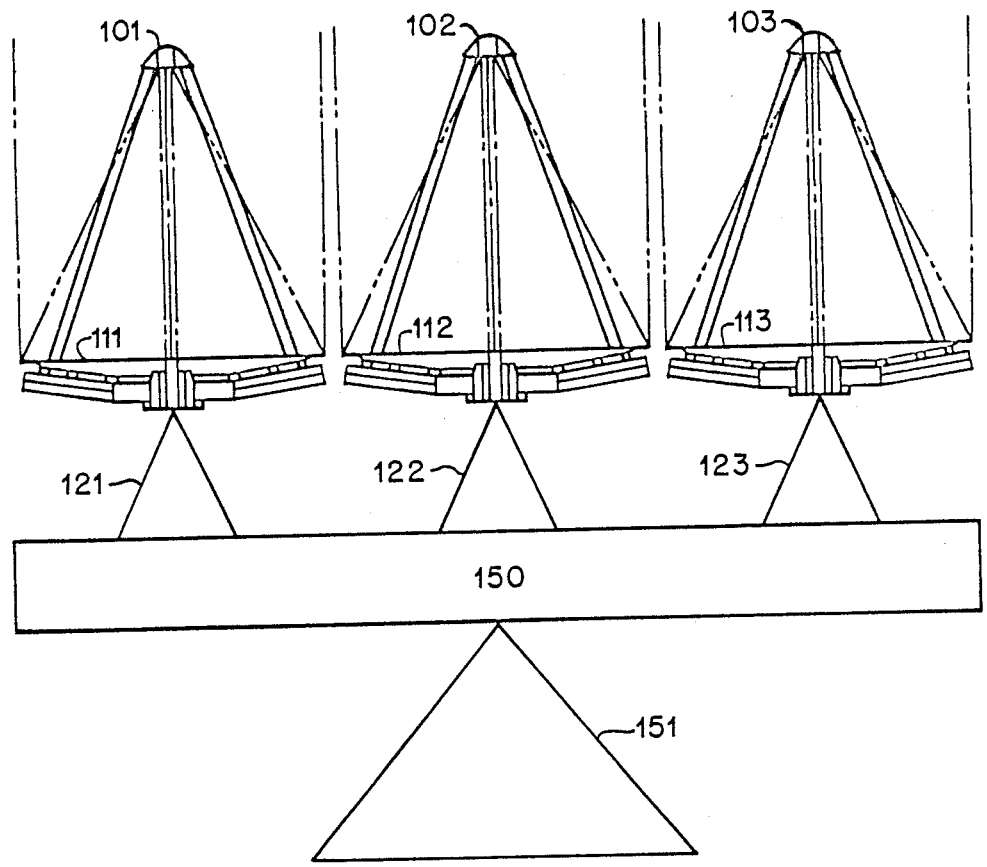
FIG. 1 is a side view of an array of the present invention.

The reader's attention is now directed towards FIG. 1 which is a side view of the center three elements of a seven element array with the design principles of the present invention. Note that this system is just meant to be an example of the design principles of the invention as discussed below beginning with a simplified overview and progressing to a detailed conclusion.

The system of FIG. 1 includes three laser telescopes 101-103 with their associated primary mirrors 111-113 individually mounted on gimbals 121-123. These element gimbals 121-123, shown schematically, allow each of these elements to be individually tilted about two axes of rotation. These individual elements have internal optical elements which are discussed in more detail below.

The array housing 150 of FIG. 1 is mounted on an array gimbal 151, shown schematically, which is capable of tilting the array housing 150 about two axes of rotation. With the mechanism of FIG. 1 understood, it is apparent that the system of the figure is capable of a combination of element slew (where 1 or more elements are tilted; called venetian blind steering) as well as array slew (in which the entire array is mechanically tilted). This ability to slew the elements provides the optical path length shift required for beam steering in the manner discussed below.

Figure 5:
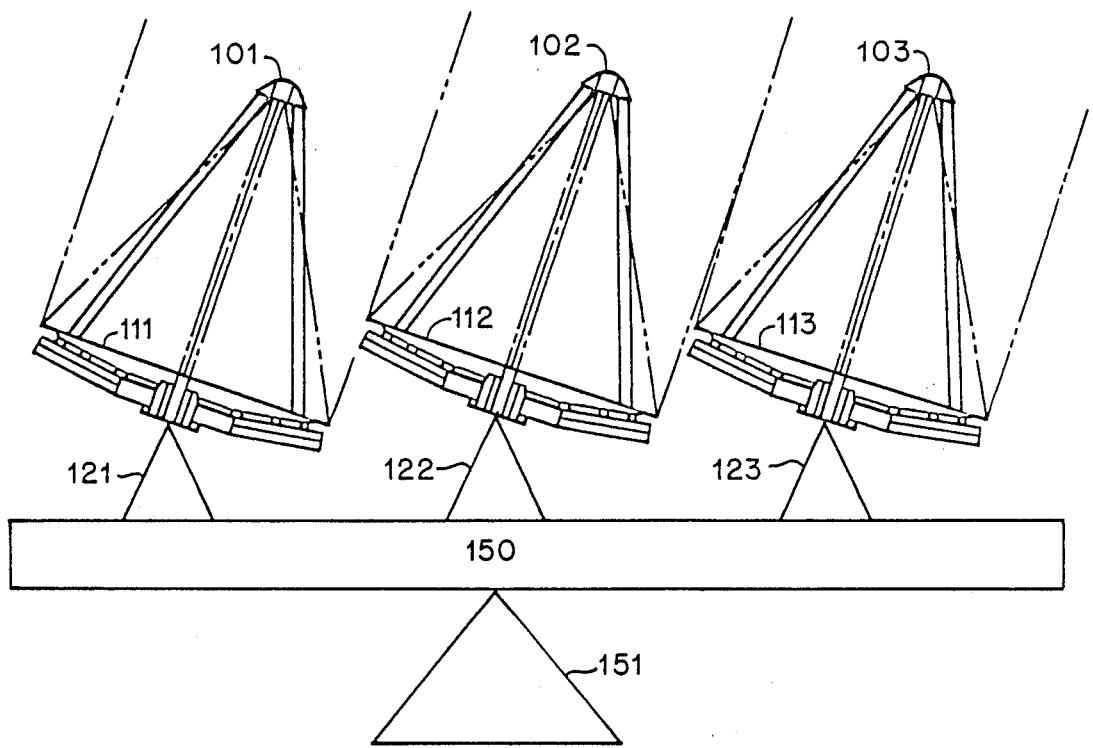
FIG. 5 is a view of the system of FIG. 1 with the elements slewing 20 degrees.

FIG. 5 shows the array elements schematically slewed on the element gimbals, and is discussed below. Retargeting is accomplished by a combination of element slew (in which the individual elements are tilted as shown in FIG. 5), rigid body array slew (in which the entire array is tilted on the array gimbal) and optical targeting.

Figure 2:
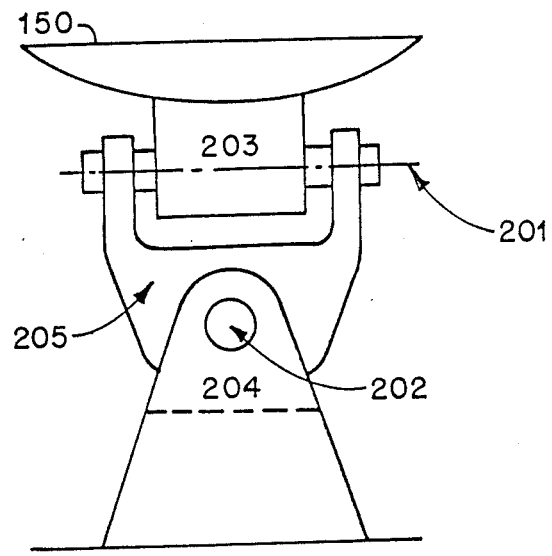
FIG. 2 is a side view of a prior art gimbal system which may be used in the system of FIG. 1.

The element gimbals 121-123 as well as the array gimbal 151 are schematically depicted in FIG. 1. FIG. 2 is an illustration of a motor-driven gimbal system that can be used to tilt an array housing 150 about two axes of rotation 201 and 202. The array housing is a frame which supports the element gimbals 121-123 as well as the elements 111-113. It is supported on an array gimbal 151 which can resemble the one depicted in FIG. 2, and which can tilt the array housing about two axes of rotation as described below. Such motor-drive gimbal systems are old in the art, and have been used to steer mechanically driven radar antenna systems at precise angular orientations for years. Further information on commercially available motor-driven gimbal systems is described in such standard texts as "Radar Scanners and Radomes" by W. M. Cady et al., published by the McGraw-Hill Book Company in 1948, the disclosure of which is incorporated herein by reference.

The motor-driven gimbal system of FIG. 2 can serve as the element gimbals 121-123 or as an array gimbal system. The motor-driven gimbal system of FIG. 2 contains the following elements: an array housing 150, a first axle which serves as a roll axis 201, a second axle which serves as a pitch axis 202, a roll gimbal 203, a pitch bail 204, and roll bail 205. As shown in the above-cited Cady et al. reference, a bail is fork which supports an axle upon which something may be mounted. A gimbal is a ring which is usually mounted on a bail. The system of FIG. 2 contains two internal motor-driven servomechanisms within its housing to rotate the roll gimbal 203 about the roll axis 201, and to rotate the pitch bail 204 about the pitch axis 202. An example of a suitable gimbal drive mechanism is illustrated in FIG. 3, and described below.

Figure 3:
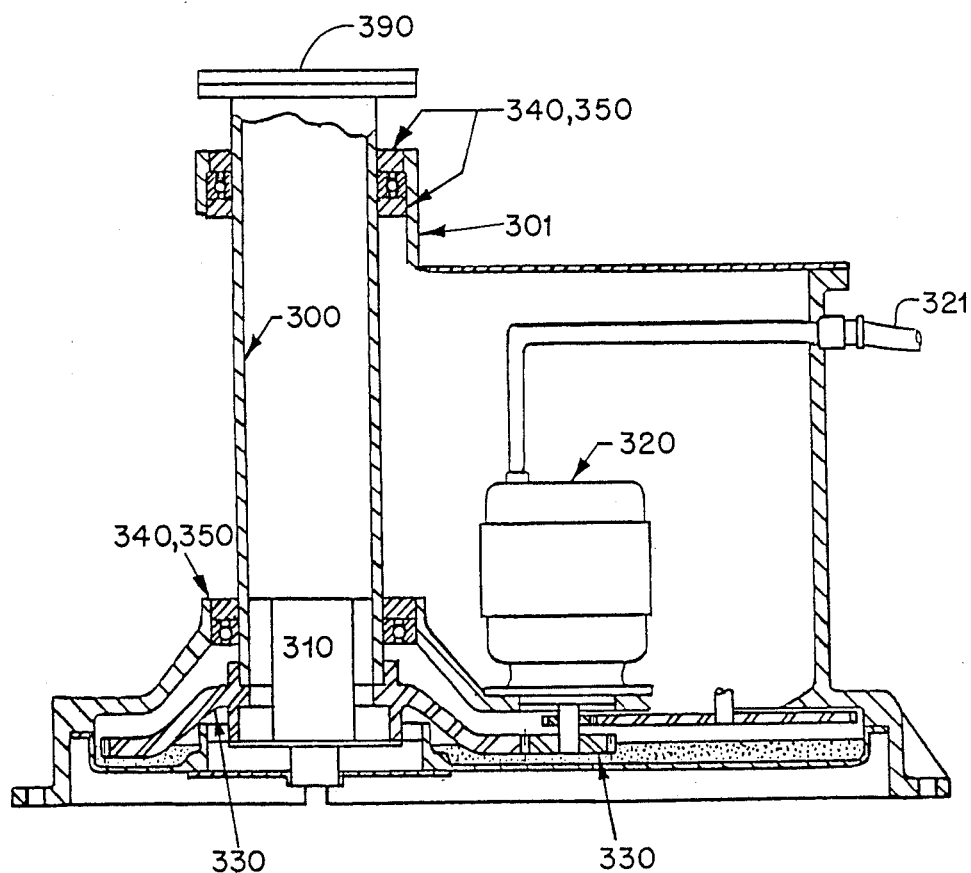
FIG. 3 schematic of the prior art gimbal drive system used in the system of FIG. 2.

FIG. 3 is a schematic of a gimbal drive mechanism that can be housed in the roll gimbal 203 or the pitch bail 204 to tilt the gimbals about the roll axis 201 or pitch axis 202. The gimbal drive mechanism of FIG. 3 may be housed inside the bail 205 of the roll gimbal 203 of FIG. 2 in order to tilt the array housing 150 about the roll axis in the manner described below.

The reader's attention is now directed towards FIG. 3 which is a schematic of one of the gimbal drive mechanisms which may be used in the present invention. The torque tube 300 is connected to the gimbal fork base 390, which is adjacent to the bail. This torque tube services as the roll axis 201, and is driven by the motor drive 320 through the gear mechanism 330.

The entire assembly of FIG. 3 is housed in a housing 301, which forms the roll gimbal 203 of FIG. 2. The torque tube extends out of the housing through an I-ring slip assembly 340 and an oil seal 350. When the torque tube is rotated by the drive motor 320, it rotates the housing to precise angles about the roll axis with respect to the gimbal fork base 390.

Before proceeding further, it should be understood that laser telescopes, projectors and individual gimbal systems are deemed to be understood in the art and such individual mechanisms need not be described. The above-cited references, including the Fender et al. reference disclose state-of-the-art laser telescopes. Additionally various tilting systems as well as the steering of beams by mirrors are also disclosed in these references. What is absent from the prior art references is the concept and example configuration needed to provide optical path length changes by element slew which are required for retargeting in accordance with the design principles of the present invention. Such information is presented below.

Figure 4:
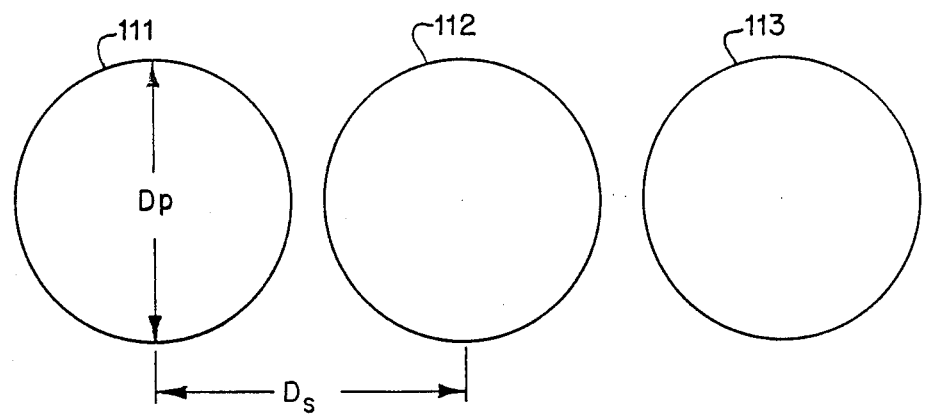
FIG. 4 is a plan view of the three optical elements of FIG. 1.

FIG. 4 is a plan view of three elements 111-113 of the system of FIG. 1 included in the seven element array. FIG. 4 also defines a number of items needed to understand the slewing principles of the present invention. The term $D_p$ is the element diameter. $D_s$ is the center-to-center separation of the elements. The selected element edge to edge separation is 5% of the element diameter. This separation allows only 17.5 degrees of off operation in worst case azimuth without vignetting. A small separation is desirable to improve the array fill factor and to reduce the span of the local loop phase sensors.

Figure 7:
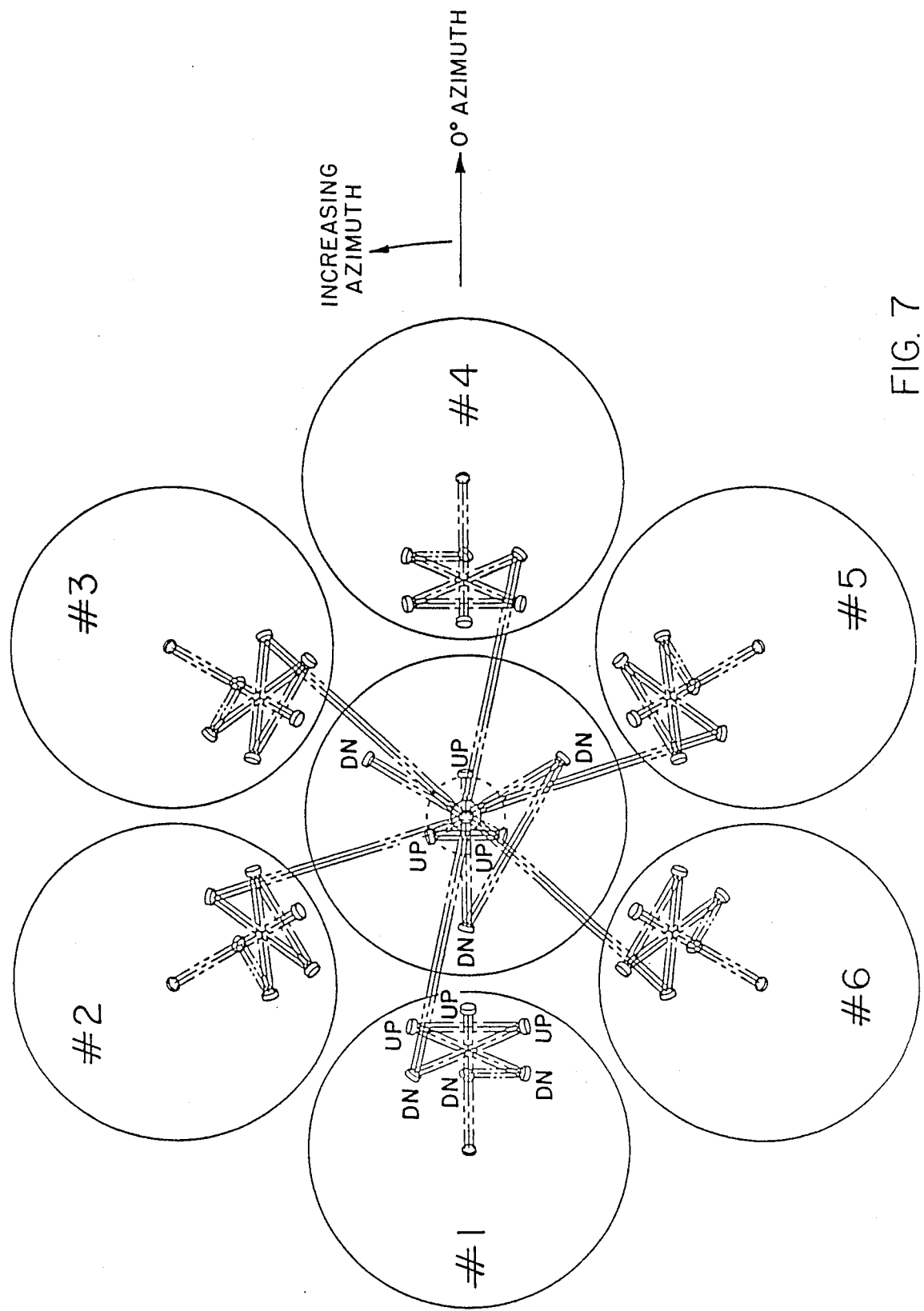
FIG. 7 is a top view of a seven element array with a sketch of its optical train and defining the azimuth of the array.

FIG. 7 is a plan view of the specific configuration showing the seven element array optical train and also defines the system azimuth. Approximate element rotation is about the vertex or center of primary mirrors.

Figure 8:
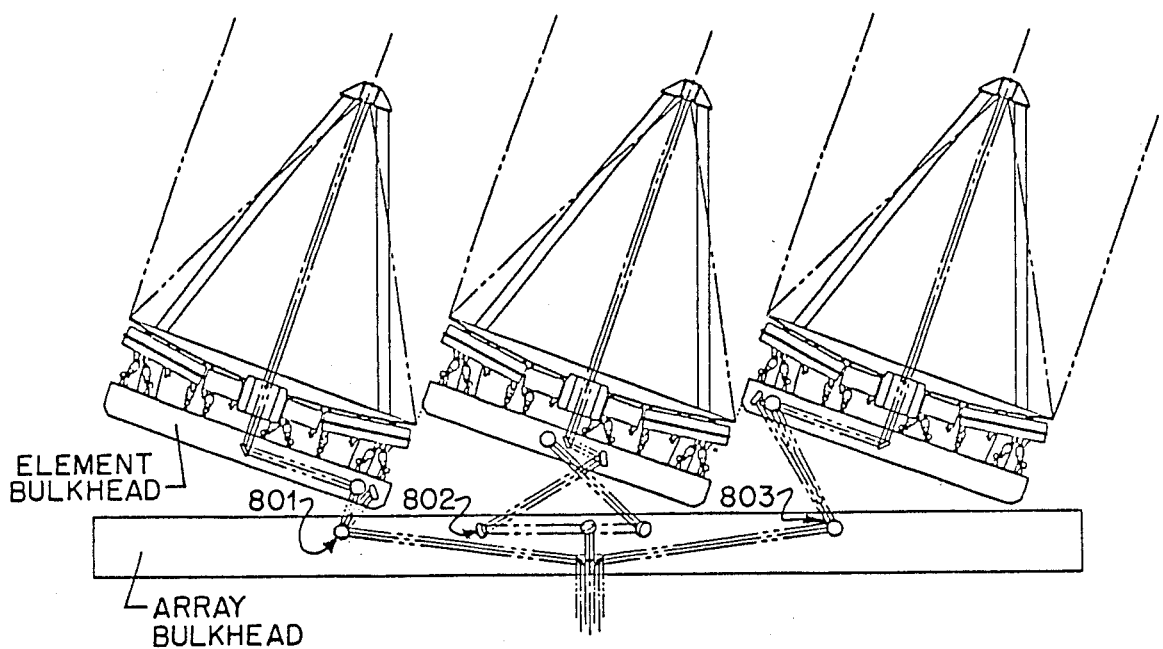
FIG. 8 is a side view of a phased array, with its optical train in venetian blind steering of 20 degrees along zero azimuth.

Mirrors designated by "UP" in FIG. 7 are in the bulkheads which support the primary mirrors of the array telescopes—the element bulkheads; mirrors designated by "DN" (i.e., down) are in the bulkhead supporting the array telescopes—the array bulkhead. FIG. 8 shows the elements rotated to point R=20 degrees at zero azimuth. The elements are also capable of independent pointing at objects within 20 degrees of the array bulkhead normal.

The configuration shown in FIGS. 7 and 8 has eight mirrors in each telescope optical train (not including the primary or secondary mirrors but including the beam divider). Each mirror is designated to reflect the beam to the next mirror in the optical train and, therefore, must be capable of low bandwidth tracking over a limited angle. These mirrors have other functions in phased array as well, e.g., jitter and phase control, adaptive optics for control of mirror figure error and field aberration correction, beam size and path adjustments, etc. The two mirror telescope system is shown although a three mirror telescope (primary, secondary, tertiary, and associated steering flat) is possible. Each telescope is constrained by gimbals or actuators to rotate about the selected point (e.g. the center of mass).

In this embodiment the design assumption made was that the element rotated about its center of mass which was nominally assumed to be vertex of the primary mirror. Location of this point of rotation has a large effect on the OPL added by the element optical train and so some such initial assumption had to be made to demonstrate the proof of this concept. Other nearby points could have been selected without altering the qualitative properties of the design. Reference to the figures shows that as the point of rotation moves outward from the array center, the OPL added to the train increases.

During venetian blind slewing from a look angle along the array axis, the OPL required to be added to the optical train of the outer elements is nominally:

$$OPL = -D_s \sin(R) \cos(A - A_t), \qquad (1)$$

where R is the pointing angle to the target from array normal, and A and $A_t$ are the element and target azimuths, respectively. A tilt of an individual element by its element gimbal (amount R) produces changes in the value of OPL of the element by approximately the value of equation 1. The method of self-compensation selected in this embodiment is to place part of the optical train on the rotating element bulkhead and part on the fixed array bulkhead as shown in FIGS. 7 and 8. Then, as the element bulkhead rotates, its separation from the array bulkhead changes to increase or decrease the OPL in the element optical train. Since, by assumption, the maximum separation of the mirrors from the rotation point at the center of the primary $D_p/2$ (without having mirrors outside of the element bulkheads) the beam must cross between the element and array bulkheads three times to obtain sufficient change in OPL to satisfy equation 1. Symmetry in the elements must be preserved so that if $A-A_t=90$ degrees, no OPL is added.

Ideally, slew of the center element need not produce a shift in OPL. In practice, however, unless the central element rotates about either the primary mirror vertex in the bulkhead or at the beam divider, the OPL through the central element will shift with element rotation by a small but non-negligible amount. This OPL shift must be added to the OPL shift from the outer elements if self-compensation of phase is to be accomplished.

The OPL correction from self-compensation need not be perfect; this concept shown in FIGS. 7 and 8 corrects for 97% of the required OPL shifts. In particular, look angle steering (LAS) by optical means such as steering mirrors also require the addition of OPL according to Equation 1. Since the telescope gimbals do not rotate in an optical LAS, this OPL change must be made by a Piston Control Mirror or PCM; thus, the PCM is available for final, precision correction of the OPL (i.e. phasing). The purpose of self-compensation is to reduce the range of the PCM during the venetian blind LAS.

For the purposes of design, a strawman venetian blind requirement limit of $R_{max}=+/-20$ degrees at any azimuth was selected as a specification achievable without serious degradation of phased array performance. Larger angle steering begins to become awkward from the point of view of angle of incidence on the mirrors. In addition, the elements must be separated by sufficient space to allow for array element off axis rotation without array element vignetting. Since this separation increases with $R_{max}$, a requirement for a larger $R_{max}$ reduces the fill factor of the aperture and degrades the point spread function from that possible with a filled circular aperture. With this in mind, the initial parameters shown in Table 1 were selected.

TABLE 1

| Self Compensation (Venetian Blind System Parameters) | | | |
|---|---|---|---|
| Parameter | Value | Description | Comment |
| $R_{max}$ | 20 deg. | Maximum Element Axis to Array Normal | |
| A, $A_t$ | All | Azimuth of Array Element, Target | Should Provide Circular Venetian Blind FOV |
| $D_p$ | TBD | Element Diameter | As Required |
| $D_s$ | 1.05 $D_p$ | Element Center to Center Separation | Space for Venetian Blind Steering & Structure |
| — | CM | Point of Rotation | Center of Mass at Primary Mirror Vertex |

Figure 9:
Figure 10:
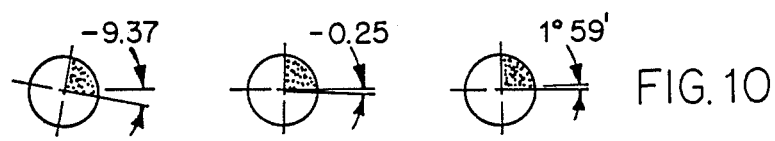
Figure 11:
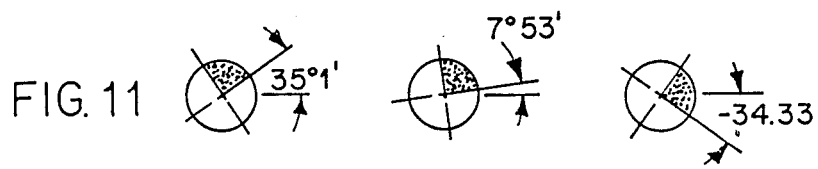

With this optical train geometry shown in FIGS. 7 and 8, the venetian blind mode of LAS will produce a rotation of the pupil summarized in FIGS. 9, 10, and 11.

FIG. 9 shows $R=0$ degrees the orientation of the exit pupil and element polarizations are shown to be aligned. In order to achieve this alignment at the exit pupil, the input pupil must have the polarizations misaligned as shown in FIG. 10. During the off axis pointing, the pupil orientation of the elements is a function of the azimuth of the element, R, A, and $A_t$. FIGS. 10 and 11 show the rotation of the exit pupil for a 20° tilt in the zero 90° azimuths, respectively. Examination of FIGS. 10 and 11 reveals that the pupil roll is nearly sinusoidal in azimuth $(A-A_t)$ with the values given in Table 2. Some asymmetry is present due to the nonsymmetric input of the beam from the beam divider to the first mirror of each element.

TABLE 2

| Pupil Rotation as a Function of Target Azimuth (Element #4) | | | |
|---|---|---|---|
| Target angle (degrees) | Pupil Rotation (degrees) | Target Azimuth angle (degrees) | Pupil Rotation (degrees) |
| 0 | 1.98 | 180 | −9.62 |
| 30 | 18.55 | 210 | −30.18 |
| 60 | 30.78 | 240 | −36.12 |
| 90 | 35.02 | 270 | −34.55 |
| 120 | 29.90 | 300 | −25.42 |
| 150 | 15.30 | 330 | −14.57 |

This rotation is expected since the elements at some array azimuth must rotate about the input beam. Although the amount of the rotation was not determined for a second value of R (say 10 degrees), the maximum pupil rotation of approximately twice the value of $R=20$ degrees, leads one to postulate that the system behaves as a "K mirror" and if R were only 10 degrees, the pupil roll would be about 20 degrees.

The effect of the pupil rotation is to misalign the polarization vectors of the elements by the values in Table 2 and FIG. 5 for off array axis pointing of $R=20$ degrees. The pupil misalignment would both decrease the peak flux on the target (decrease the Strehl ratio) and affect the phase sensing systems. Although the effect could probably be ignored if R were less than 10 degrees, the reduction in peak is probably too large if a significant number of targets are engaged at R is greater than 10 degrees.

More important than misalignment of polarization is that the pupil geometry is not preserved if the element pupils are rotated by unequal amounts. Non-preservation of pupil geometry in a phased array reduces the useful imaging field of view. Pupil rotation could be corrected by "K mirrors" in the optical train of each element; however, a single K mirror adds three reflections to the system and, requires another change such as adding a second K mirror or changing the beam combiner geometry.

Returning to the illustration of FIG. 1, each element is also capable of adjusting the phase of its output by adjusting the optical path length between a set of internal mirrors which function as an optical trombone. Each of the elements 111-113 in FIG. 1 actually has these eight mirrors (including the beam divider). These mirrors are depicted in functionally in FIG. 6, and are described below in terms of their operation. This phase adjustment by internal adjustments of the optical path length is described in such systems as the above-cited Fender reference, and allows the optical array a third method of beam, retargeting (as discussed below).

Figure 6:
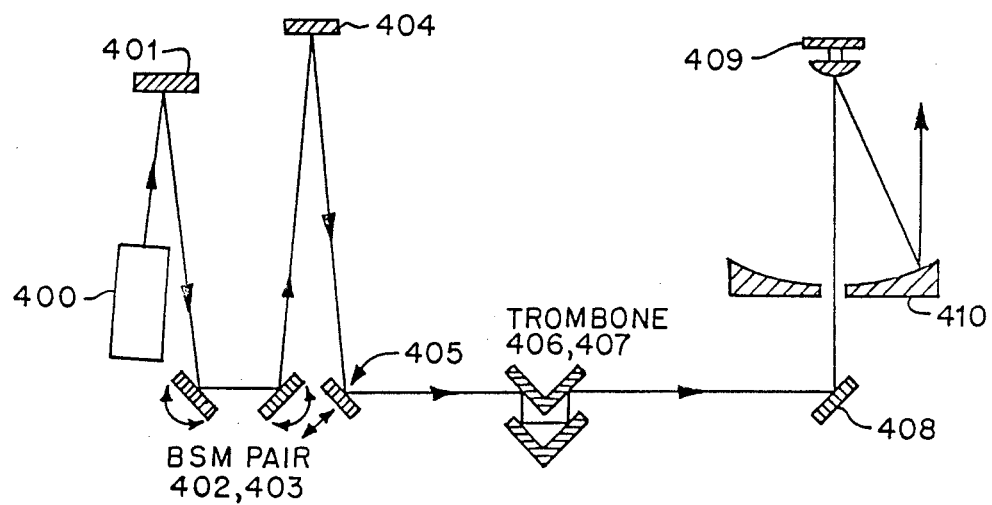
FIG. 6 is an illustration of the optical components which function as a single element in the systems of FIGS. 1-4.

FIG. 6 is an illustration of the mirrors of the internal optical path length adjustment mechanism possessed by each of the elements of FIGS. 7 and 8. As shown in FIG. 6, the output of each laser 400 passes through: a deformable mirror 401, a pair of beam steering mirrors 402, 403, a near-normal mirror 404 which moves normal to its face, a turning mirror 405 which moves normal to its face, an optical trombone or corner cube 406, 407, and a beam expander secondary mirror system 408–410. Each optical element has the potential to provide piston control to these elements as required to steer the beam. The optical trombone or corner cube 406 and 407 is driven together or apart to increase or decrease the internal optical path length of the outgoing laser beam. As shown in the Fender et al., reference, these changes in the optical path lengths in individual laser elements are capable of producing corresponding phase changes in the outputs of each of the elements. In aggregate across the face of the array, these changes in phase of individual elements are capable of steering the array output in the same manner that the elements of phased array radars electronically steer radar tracking signals.

Note that most of the mirror elements of FIG. 6 perform functions that are known in the art. These need not be elaborated or in detail because they are not essential to the present invention. However they are briefly mentioned as follows. The deformable mirror 401 is used to adjust the outgoing laser beam to perform "beam cleanup". In other words this mirror is adjusted to compensate for known optical errors in the system. The beam steering mirrors 402, 403 are tilted to produce corresponding angle changes in the output of the element beam. Phase adjustment is performed by the optical trombone 406 and 407. Finally, the beam expander mirror output system 408–410 is regarded as a standard output of a laser telescope, and includes a typical parabolic output mirror 410. This serves to reflect the laser from the optical trombone out of the element, with the phase of the output beam suitably adjusted.

Optical steering is performed by adjusting the phase of the laser beam outputs in the same manner that the elements of a phased array of radar elements are electronically steered.

More specifically, the entire array is a synthetic aperture formed from the aggregate of its individual elements. By advancing the phase of the outputs of the elements on a the bottom of the array, and retarding the phase of the outputs of the elements on the top of the array, the collective output of the array is steered towards the top of the array. This method of electronically steering an array is discussed below.

Steering a radio frequency emission by phase adjustment is believed to be known in the art, and is explained in greater detail in such standard texts as "The Introduction to Radar Systems" by Merrill I. Skolnik, which was published by the McGraw Hill Book Company in 1962, and which is incorporated herein by reference. The above-cited Skolnik reference describes radar systems which have substantially a vertical array of antenna elements which have a top and a bottom. The top of the array is the portion of the array that is the highest above the ground, while the bottom of the array is that portion which is closest to the ground.

Various methods of shifting the phase of the outputs of antenna elements are described on pages 307–312 of the Skolnik reference, and one of these methods entails adjustment of the cable length as follows. All of the antenna elements in an array receive signals that they will transmit through a network of feed cables which electrically connect the elements with the radar transmitter. Ideally, the feed cables are all the same length, so that each element receives the same signal with the same electrical phase. In the example presented above, the collective output of the array was described as being steered towards the top of the array by advancing the phase of the signal for the elements on the bottom of the array, and retarding the phase of the signal with respect to the elements on the top. As described in the Skolnik reference, this adjustment in phase may be accomplished by adjusting the length of the feed cables. More specifically, if the feed cable length of the elements on the bottom of the array are shortened by a quarter wavelength, the phase of the signals they receive is advanced by 90°. Similarly, if the length of the feed cables of the elements on the top of the array is lengthened by a quarter wavelength, then the phase of the signals they receive is retarded by 90° with respect the signals received by elements whose feed cable lengths are unchanged. As mentioned above, pages 307–312 of the Skolnik reference describes a variety of different phase shifting devices, but these are believed to be known in the art, an need not be redescribed here. Optical steering of an array of telescopes is not, in and of itself, believed to be new. Mechanical steering of an array, in and of itself, is not believed to be new. However, the combination of array slewing element, and optical steering to selectively steer the output of an array of laser telescopes respectively over large angles, medium angles, and small angles, is believed to be new in the art, and pattern for systems of the future to follow.

Figure 8A:
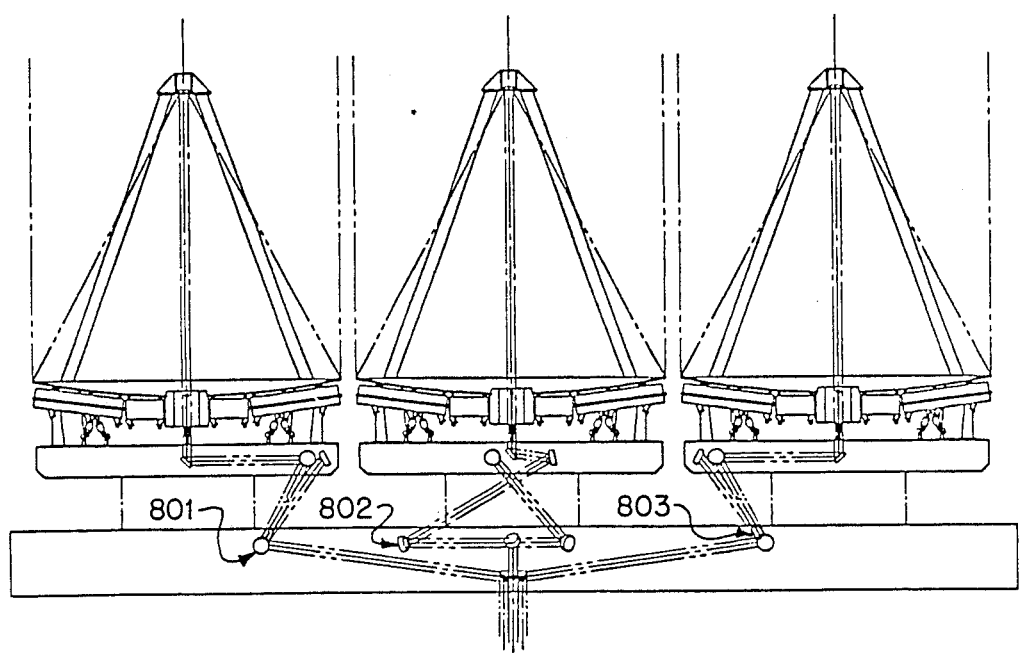
FIG. 8a is a side view of a phased array, with its optical train in venetian blind steering of zero degrees along zero azimuth.
Figure 12A:
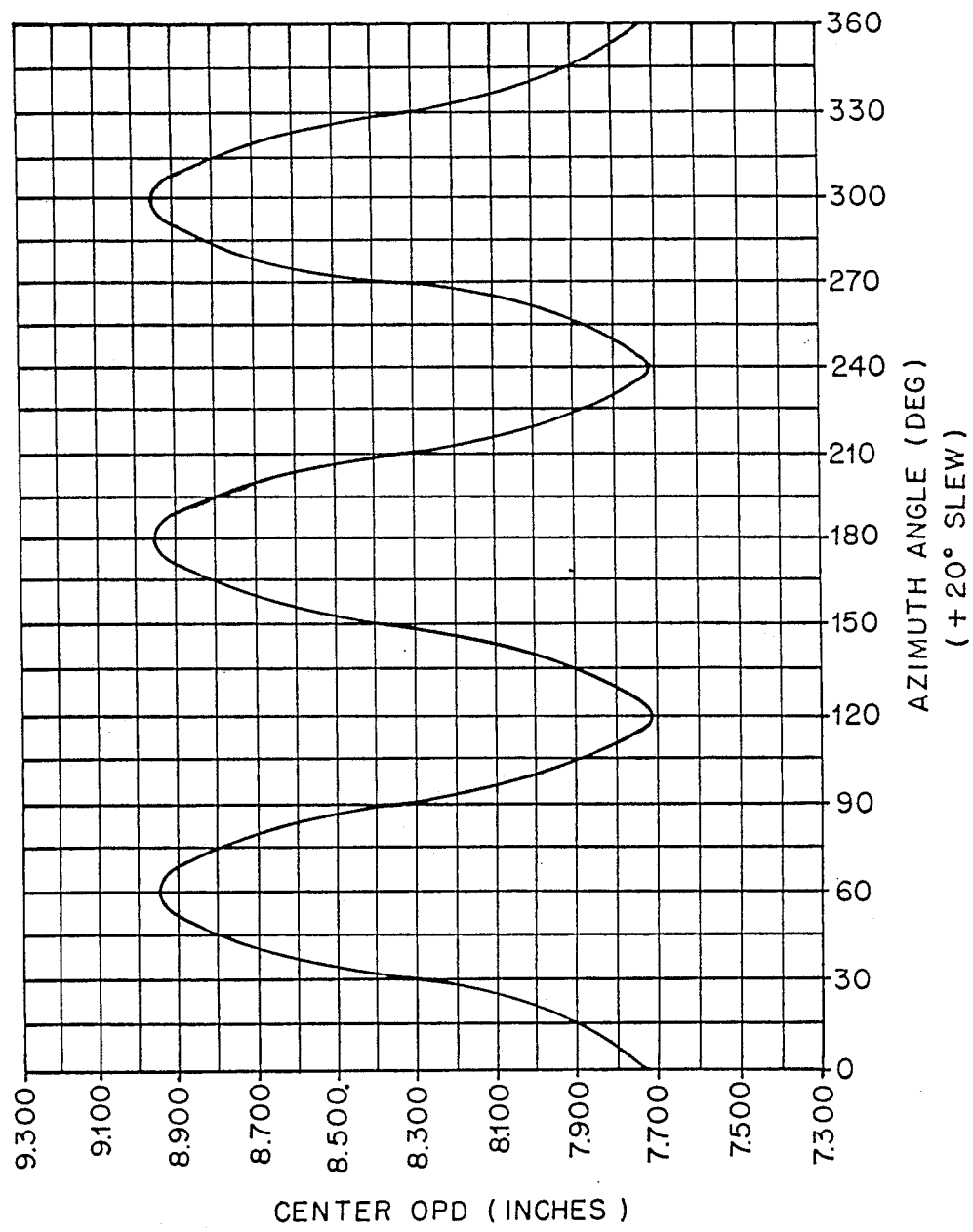
FIG. 12 is a chart of the calculation of OPD between the center array element and the array element #1 in FIG. 7.
Figure 12B:
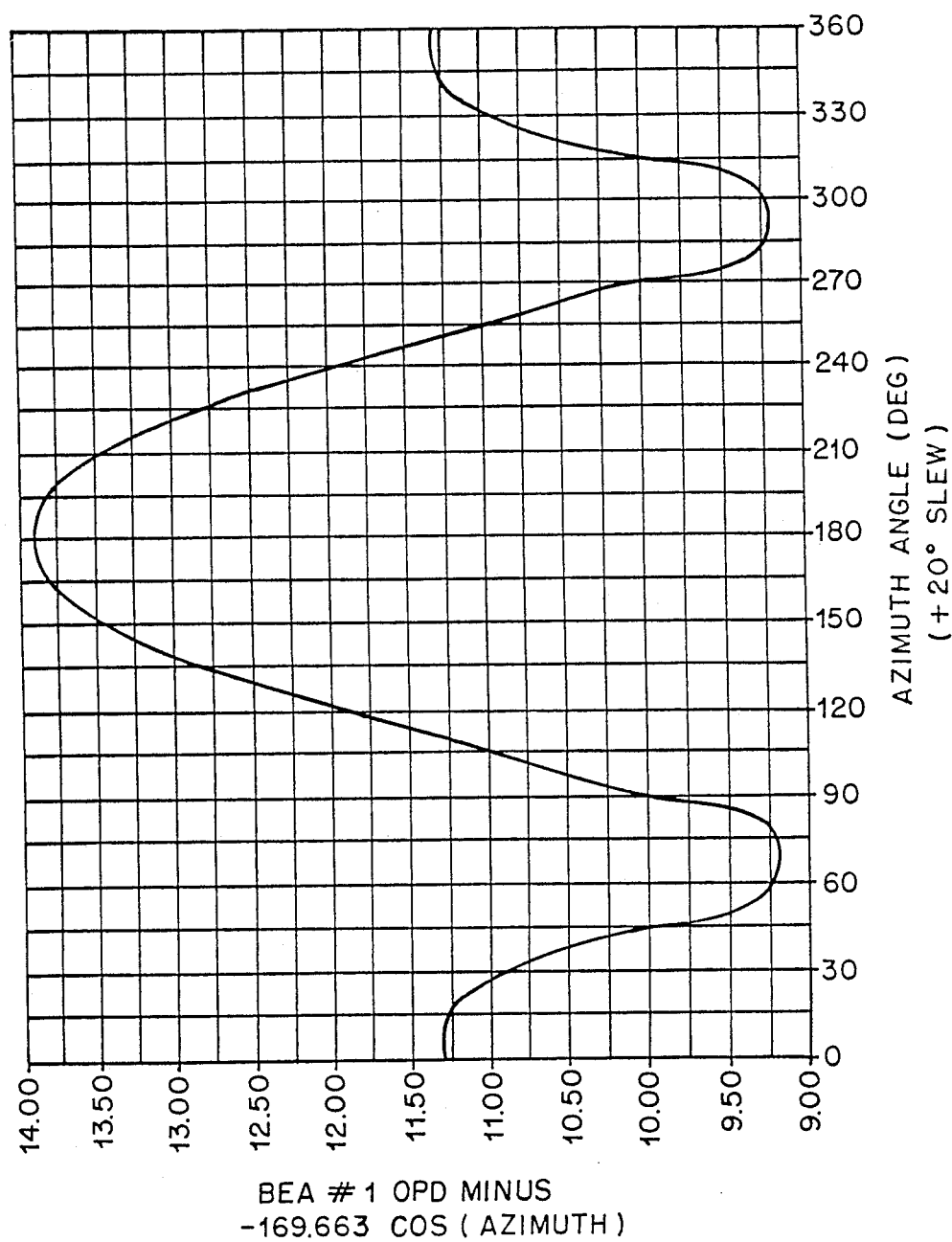

Let us discuss the OPL properties of the optical train shown in FIGS. 7 8. For $R=0$, the OPL from the entrance pupil to the exit pupil in FIG. 8a is the same for all seven elements. At $R=20$ degrees, however, the OPL through each of the elements depends on the object azimuth. The upper right of FIG. 12 shows the change in OPL of the center element in percent of $D_s$ (sin $2\theta$) as the azimuth of the object under observation is changed. As the center element axis rotates away from the array axis, the center element OPL changes by between 4.6 and almost 5.4 percent of $D_s$ depending on the pointing azimuth. There is a 120 degree symmetry in the OPL variation as is expected from the geometry of the center element optical train.

The bottom right inset of FIG. 12 shows the required OPL versus $A_i$ of the wavefront for element #1 calculated according to Equation 1. (For venetian blind off axis pointing at zero azimuth, element #1 OPL must be shortened and element #4 OPL must be lengthened.) The second from the bottom right inset shows the actual OPL of element #1. The second from the bottom right inset shows the actual OPL cf element #1. The difference between the two is given in the second from the top right inset. Note that the vertical component is spread to exaggerate the plot shape. The large graph of FIG. 9 shows the difference of this residual and the OPL of the center element. This is the error which must be compensated for by the PCM. Depending on the azimuth, at $R=20$ degrees, the PCM of element #1 must move to correct a piston wavefront error of only up to 3% of the distance which would have been required without self-compensation of OPL.

Figure 13:
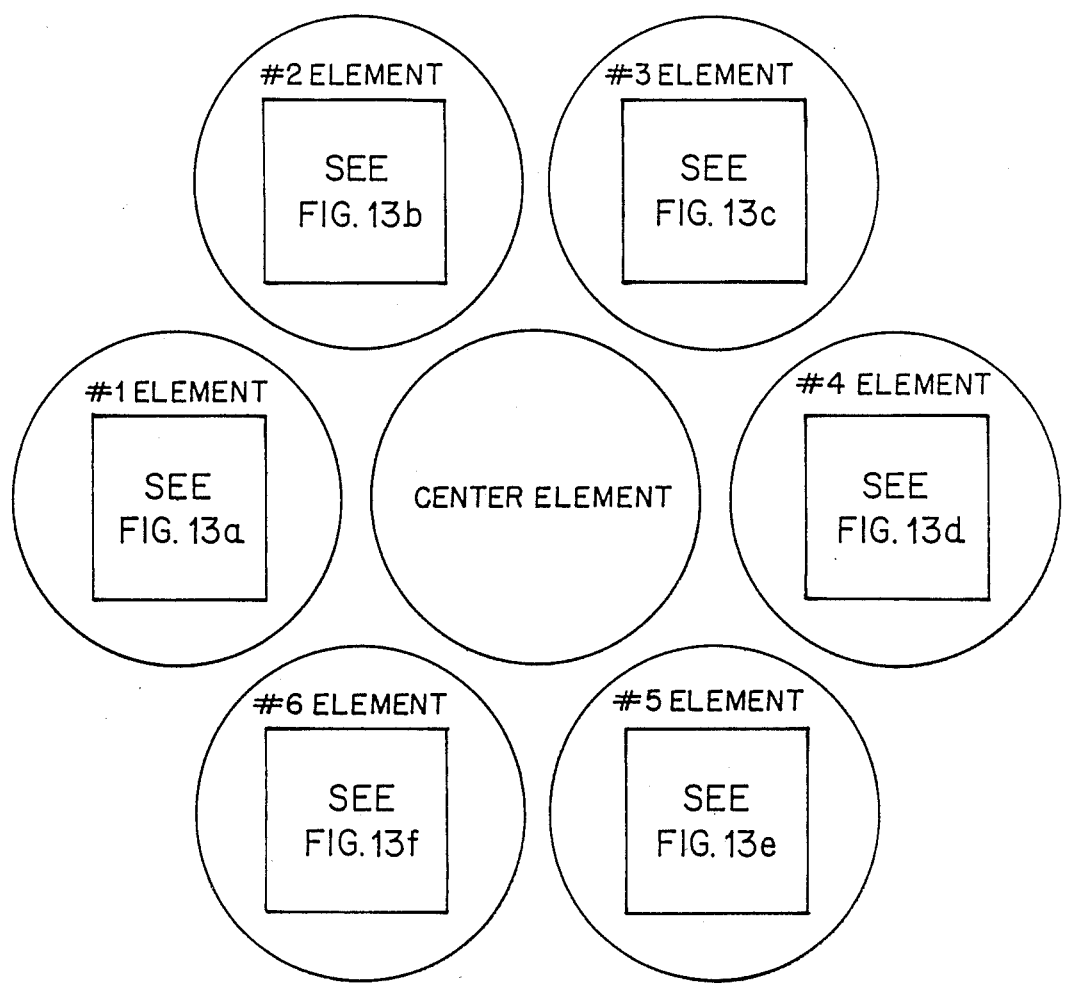
FIG. 13 is an illustration of the optical path difference (OPD) variation with respect to azimuth angle between the center array element and array elements 1 through 6 in the array of FIG. 7.
Figure 13A:
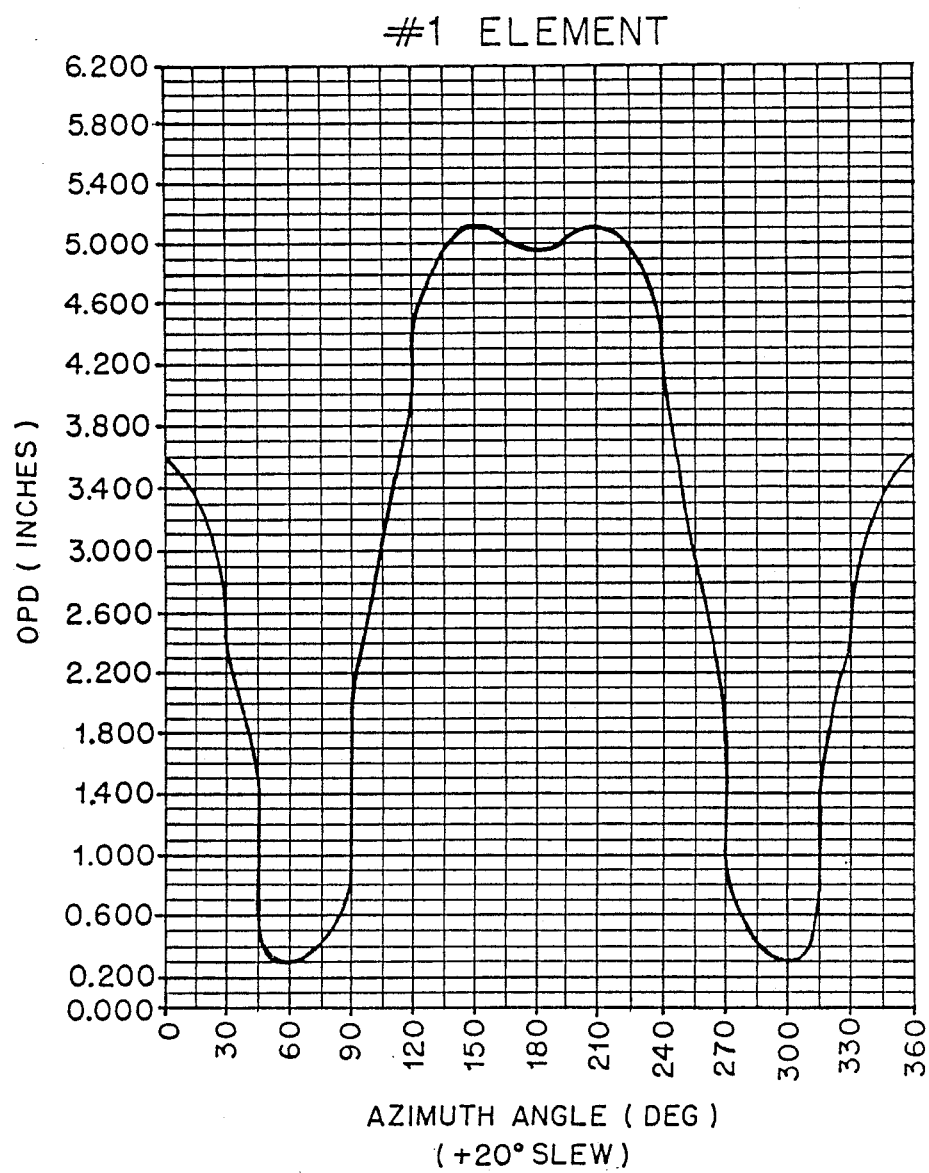
Figure 13B:
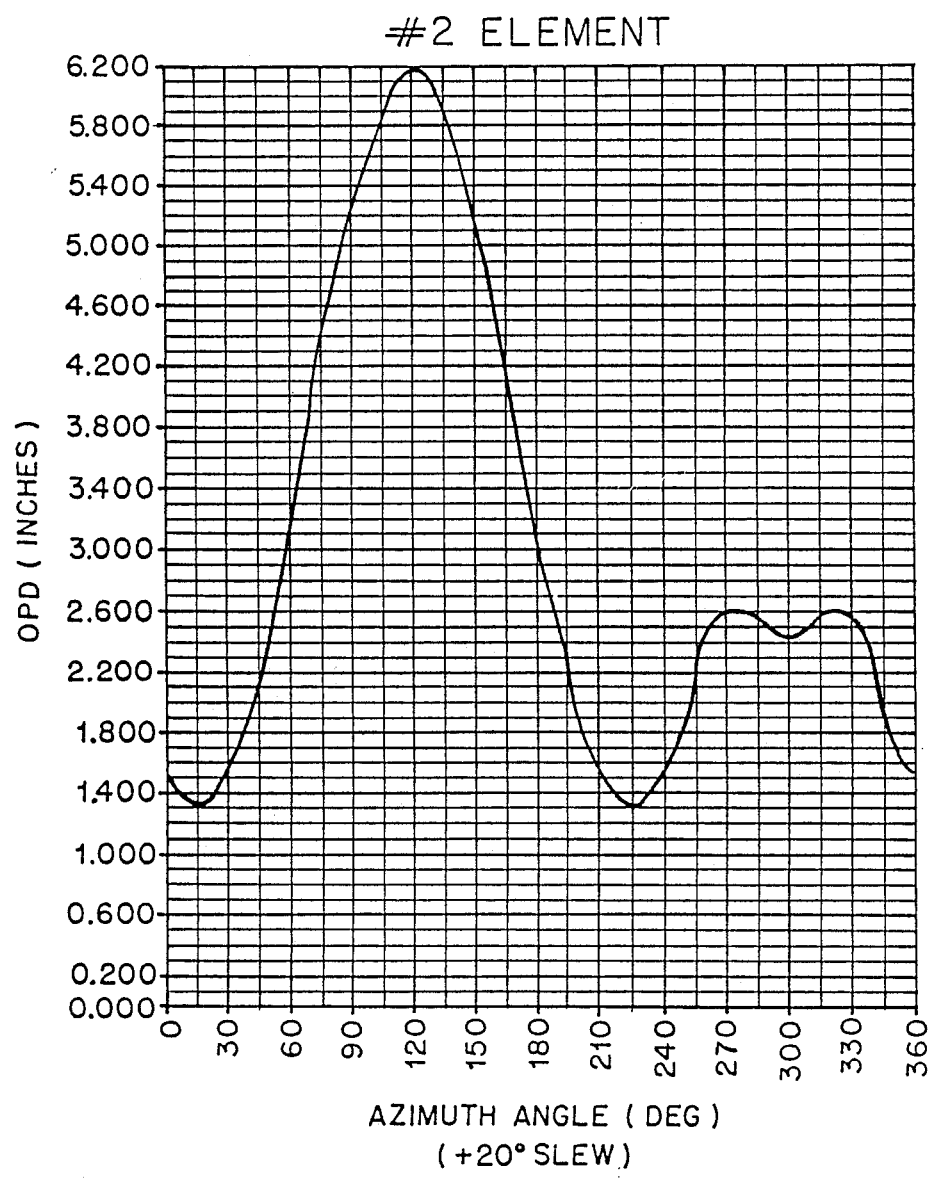
Figure 13C:
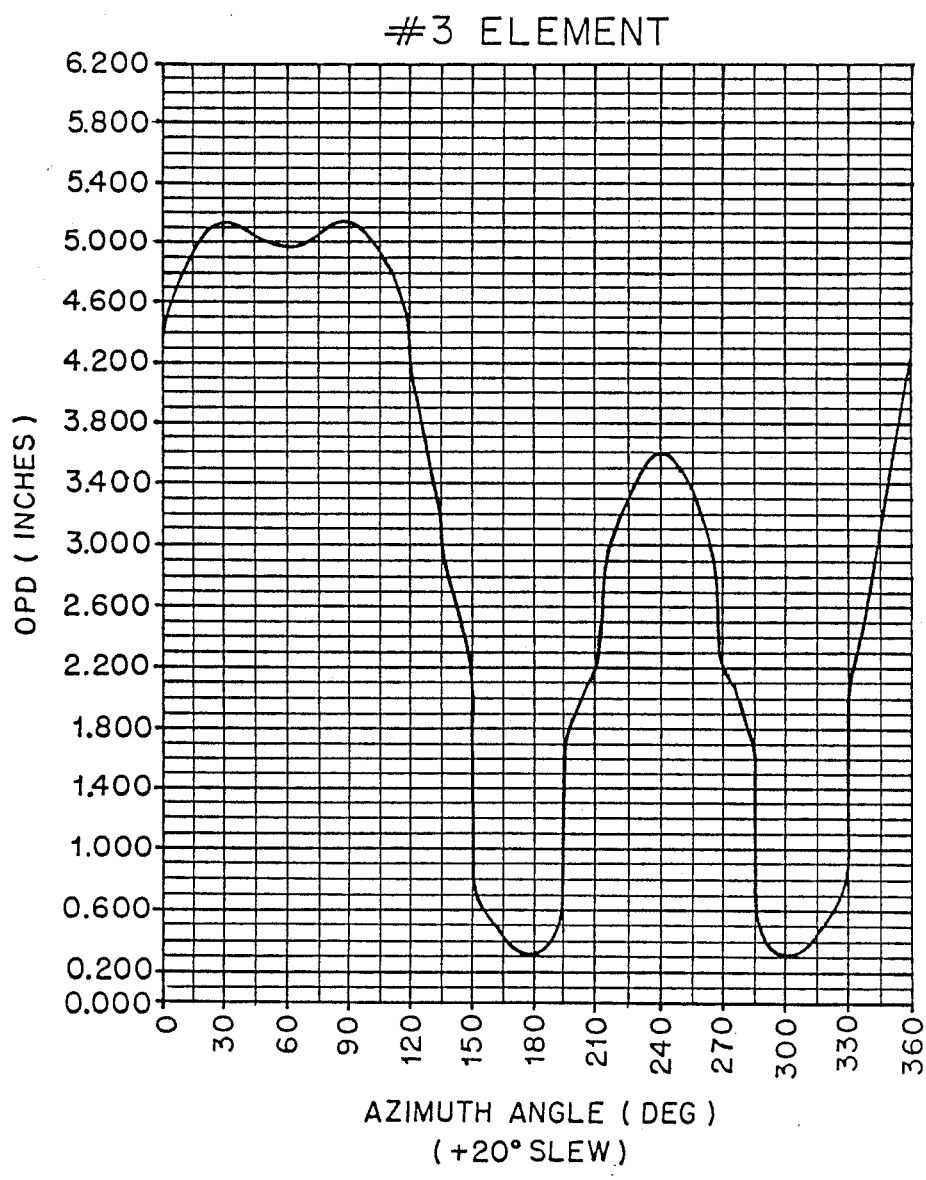
Figure 13F:
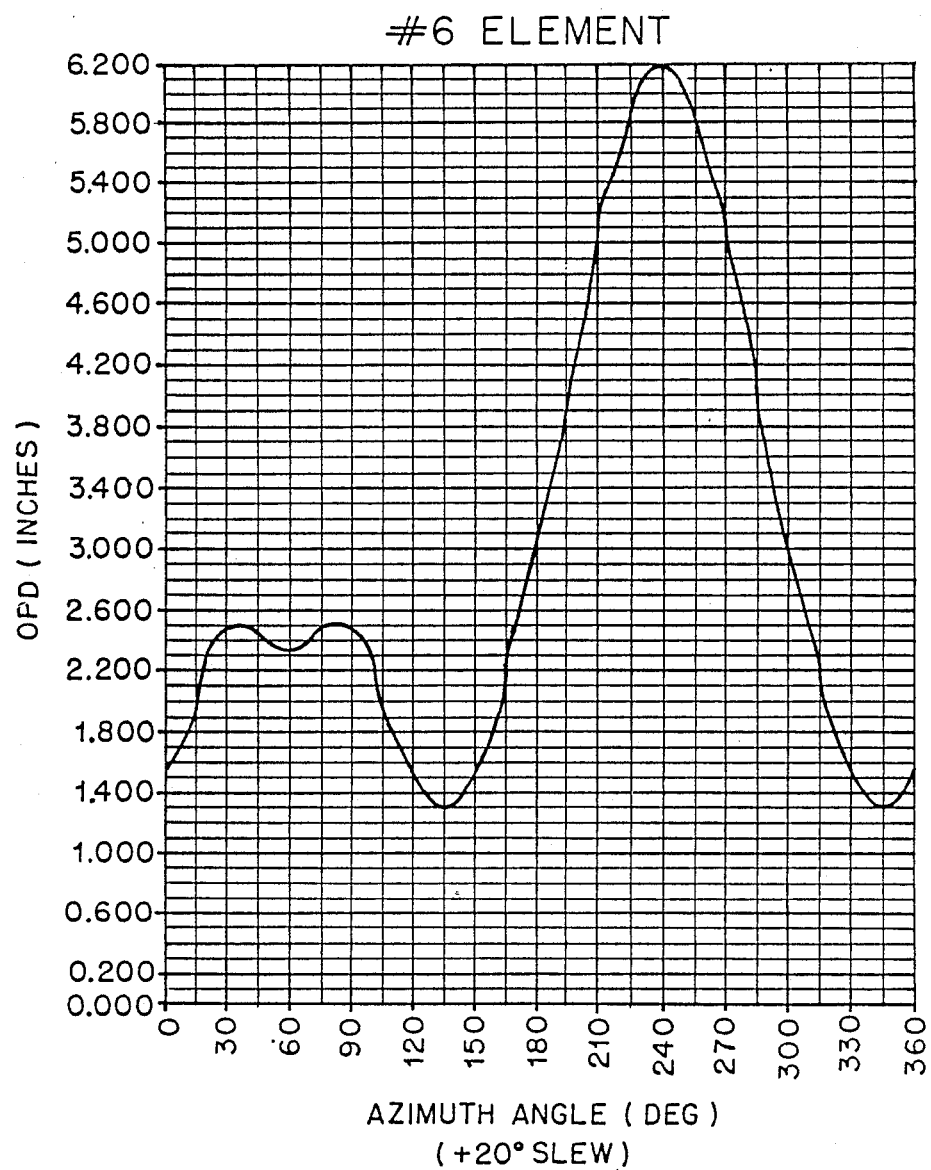

A similar OPL summation was performed on each of the outer elements for $R=20$ degrees. The results are shown in FIG. 13. Variations in the OPL from element to element are caused by the difference in OPL phase between the center and the outer optical trains. As R is reduced from 20 degrees to zero, the amplitude of the PCM correction required also goes to zero.

The OPL of all elements should be the same at R=0 degrees to preserve a common path length from the object to the sensor. The OPL should change according to Equation 1 for the outer elements. These considerations lead to a configuration in which the light beam crossed between the telescope and the array bulkheads three times. A second ring in the array would have required five bulkhead crossings.

The OPL of the center element should be as small as possible while minimizing OPL variations with azimuth. This consideration lead to a center element crossing beam configuration much like the legs of a patio table with 120 degree symmetry. To obtain symmetry in between angles at R and R+180 degrees, the mirrors in the element bulkheads were positioned so that R=0, the beams crossing between the bulkheads are the normal of a vector drawn from the point of rotation to the mirror reflecting that beam, i.e., the mirror moves along that beam around R=0. The mirrors are centered about the axis of the center element.

The mirror configurations of the outer elements are identical except for a 60 degree rotation. The mirrors of the optical train shown in FIGS. 7, 8 and 8a (including mirrors 801, 802 and 803) are positioned close to the center element. With this off center positioning of the mirrors of the optical train including mirrors 801-803 along a line through the center element, the OPL changes greatly for any off axis pointing along this line. The amount of change is adjusted by positioning the mirrors closer or further from the outer element center. As the position is varied, the placement of the mirrors must also be adjusted to maintain the condition set forth above (that the light beam lies along a normal of the vector drawn from the point of rotation of the telescope to the mirror reflecting that beam). The above-cited Skolnik reference is valuable for two reasons. First, it shows specific systems of adjusting the phase of electronic signals received by elements by adjusting the lengths of the feed cables that supply signals to those elements. Second Skolnik shows how the technology of phase adjustment has been used by radar systems to steer radio frequency emissions electronically. The Fender et al. reference represents a similar milestone, but is directed towards a phased array of laser telescopes. Fender et al. teach the adjustment of the phase of the outputs of the array of laser telescopes by adjusting the length of the optical paths of individual lasers, using adjustable mirrors in an optical train which act as an optical trombone. On the system of FIGS. 8 and 8a mirrors 801-803 are candidates that can serve as an optical trombone.

Since no change in OPL is required for pointing in the direction perpendicular to the line from the outer element center to the center element center, the outer element optics are positioned symmetrically about that line. Therefore, when pointing perpendicular to that line, the OPL increase of one mirror moving away from the array bulkhead is cancelled by an OPL decrease of another mirror moving closer.

This configuration reduces by 97% the required motion of the phase control mirrors during venetian blind slewing. Disadvantages include the requirement for extra mirrors in each optical train and a device (e.g. a "K mirror") in each element optical to rotate the pupil as appropriate to preserve pupil geometry. The amount of pupil and polarization rotation present is nominally twice the angle of off array axis pointing which for this study was assumed to be 20 degrees. The additional mirrors per optical train required to accomplish this compensation may be required for other reasons (e.g. for phase or jitter control).

While the invention has been described in its presently preferred embodiment is understood that the words which have been used are words of description rather than words of limitation and that changes within the purview of the appended claims may be made without departing from the scope and spirit of the invention in its broader aspects.

What is claimed is:

1. A phased array telescope and laser beam projector which has a steerable look angle and outputs a steerable beam, said phased array telescope comprising:
    an array housing;
    an array gimbal system upon which said array housing is mounted, said array signal system being capable of tilting said array housing about two axes of rotation;
    a first gimbal drive system which is mechanically connected to said array gimbal system to serve as a means for tilting the array gimbal with controlled tilting to mechanically steer said phased array telescope over large angles;
    a plurality of transmitting optical elements, each being mounted on said array housing;
    a plurality of element gimbal system, each of which are mounted upon said array housing, and each of which have one of said plurality of optical elements mounted upon it, each of said element gimbal systems being capable of tilting one of said plurality of optical elements about two axes of rotation; and
    a plurality of second gimbal drive systems, each of which are mechanically connected to one of said plurality of element gimbal systems to serve as a means for tilting each the element gimbal of said transmitting optical elements to mechanically steer said phased array telescope over medium angles, said medium angles being less than 20 degrees.

2. A phased array telescope system which outputs a steerable beam, said phased array telescope system comprising:
    an array housing;
    a means for tilting said array housing about two axes of rotation to mechanically steer said phased array telescope system over large angles;
    a plurality of transmitting optical elements, each being mounted on said array housing and transmitting an output signal; and
    a means for tilting each of said plurality of transmitting optical elements about two axes of rotation to mechanically steer the output signal of the plurality of transmitting optical elements over medium angles, said medium angles being less than 20 degrees.

* * * * *